United States Patent [19]
Mailander et al.

[11] 4,337,611
[45] Jul. 6, 1982

[54] AUTOMATIC CONTROL OF A COMBINE THRESHING CYLINDER AND FEEDER CONVEYOR

[75] Inventors: Michael P. Mailander, Lafayette; Gary W. Krutz; Larry F. Huggins, both of West Lafayette, all of Ind.

[73] Assignee: Purdue Research Foundation, West Lafayette, Ind.

[21] Appl. No.: 215,056

[22] Filed: Dec. 10, 1980

[51] Int. Cl.³ ............................................. A01D 41/00
[52] U.S. Cl. .............................. 56/10.2; 56/DIG. 15
[58] Field of Search ......................... 56/10.2, DIG. 15

[56] References Cited

U.S. PATENT DOCUMENTS

| | | | |
|---|---|---|---|
| 2,639,569 | 5/1953 | Pasturczak | 56/DIG. 15 |
| 3,073,099 | 1/1963 | Andersen | 56/DIG. 15 |
| 3,093,946 | 6/1963 | Pitt et al. | 56/DIG. 15 |
| 3,470,681 | 10/1969 | Saemann | 56/DIG. 15 |
| 3,481,122 | 12/1969 | Pool et al. | 56/DIG. 15 |
| 3,552,398 | 1/1971 | Looker et al. | 56/DIG. 15 |
| 3,606,742 | 9/1971 | Weineke et al. | 56/DIG. 15 |
| 3,609,947 | 10/1971 | Herbsthoffer | 56/DIG. 15 |
| 3,721,301 | 3/1973 | Weasel, Jr. et al. | 56/DIG. 15 |
| 4,130,980 | 12/1978 | Fardal et al. | 56/DIG. 15 |

FOREIGN PATENT DOCUMENTS

| | | | |
|---|---|---|---|
| 1536522 | 12/1978 | United Kingdom | 56/10.2 |
| 2047427 | 11/1980 | United Kingdom | 56/10.2 |
| 221409 | 9/1968 | U.S.S.R. | 56/10.2 |
| 296508 | 4/1971 | U.S.S.R. | 56/10.2 |
| 554832 | 4/1977 | U.S.S.R. | 56/10.2 |

Primary Examiner—Paul J. Hirsch
Attorney, Agent, or Firm—John R. Nesbitt; Robert E. Harris

[57] ABSTRACT

The threshing cylinder and feeder conveyor of a combine with electrohydraulic elements are controlled by a digital computer. The computer generates a proportional voltage which is input to a linear amplifier. The amplifier provides control of the spool of an electrohydraulic servovalve. The servovalve controls the speed and direction of the threshing cylinder and feeder conveyor hydraulic motor drive. Tachometer sensors provide feedback measurement of the actual speed of the hydraulic motor output shaft. Analog-to-digital converters (A/D's) interface the computer with the sensors. Control algorithms employ velocity feedback and compensation for pressure rises due to increases in the torque on the cylinder caused by the material to be threshed entering the threshing cylinder-concave region. Easy reversal of the direction of the threshing cylinder and feeder conveyor, eliminating some of the problems associated with plugging, is available with this type of speed control equipment. This technique also affords the ability to monitor the material feed rate by monitoring the pressure across the cylinder and feeder drive motors.

13 Claims, 22 Drawing Figures

AUTOMATIC CONTROL OF A COMBINE THRESHING CYLINDER AND FEEDER CONVEYOR

This invention relates to automatic controls and specifically to an automatic control system for the threshing cylinder and feeder conveyor of a grain harvesting combine.

Farming currently involves very low profit margin products, so a major incentive exists for farmers to optimize their production operations and to maintain them at maximum efficiency. Each resource of the farming enterprise must be used to its fullest potential. The overall effectiveness of agricultural machinery is dependent upon a combination of its design, reliability, and operating conditions. The primary functional objective of harvesting equipment is to collect the crop in the minimum amount of time with the least losses and product damage for the lowest capital and operating costs.

The modern grain combine represents one of the most operationally complex and costly pieces of agricultural equipment. It must gather the crop, thresh the grain, and separate and clean the threshed grain from the other plant parts that enter the machine. Its level of performance in accomplishing these functions can be profoundly influenced by a multitude of operator adjustments, many of which can be made during actual operation. The combine also encounters a wide range of harvesting situations and crops. Because of these factors and the potential return obtainable for performance improvements, development of a control system for the combine is desirable.

Human factors studies have shown a limit to the number of input and output signals a human can adequately assimilate and control in a reasonable span of time. With the current control sophistication level on a combine, the operator is overburdened. Operator environmental isolation due to the use of enclosed cabs also contributes to the difficulties in adjusting the combine to minimize losses and crop damage while preserving a reasonable rate of harvest. In addition, the operator may be inexperienced and not capable of adjusting the machine as conditions change. Given these factors, the advantages of relieving the operator of some machine adjustments is apparent.

Similar problems are encountered in the aerospace field. Their solution has involved the utilization of computers connected to sensors and actuators which automatically control certain aspects of the craft. Safety considerations demand high component reliability which is accompanied by high cost. This high cost, combined with the lack of adequate sensors and actuators, has discouraged the widespread application of computer control to the mobile equipment area. However, in recent years, technological advancements have resulted in the development of control equipment more suited in terms of cost and ruggedness to the mobile equipment market. The recent development of low cost powerful microprocessors which can withstand harsher environments has also opened up new application possibilities, one of which is on-board microprocessor control of mobile equipment.

The major automobile manufacturers have also spurred the development of sensors and actuators, as well as advances in automatic control theory necessary for a more widespread use of automatic controls on mobile vehicles.

In 1978, the United States produced over 180 million metric tonnes of feed corn (USDA, 1979). Much of this production went to exporting countries, whose complaints of low quality prompted analysis of the causes of damage (Paulsen, M. and L. Hill, "Corn Breakage in Overseas Shipments—Two Case Studies," ASAE Paper No. 77-3503, St. Joseph, Mich., 1977). Increased competition for these corn export markets requires a reduction in the amount of damage caused by all handling procedures.

The amount of kernel damage caused by the combine has received much attention. Researchers collected samples of corn from farmers' combines in Ohio for three years (Byg, D. M. and G. E. Hall, "Corn Losses and Kernel Damage in Field Shelling of Corn," *Transactions of the ASAE*, St. Joseph, Mich., 11(2):164–167, 1968). They reported an average of 2.3% of the corn sample passed through a 12/64 inch round hole screen. USDA grading standards require that less than 2% may pass through the same type screen for No. 1 grade, and less than 3% for U.S. No. 2 grade corn. Others found the amount of grain damage caused by the threshing cylinder and concave grid region range from 12.0% to 60.0% of all field-caused damage (Mahmoud, A. R. and W. F. Buchele, "Corn Ear Orientation Effects on Mechanical Damage and Forces on Concave," *Transactions of the ASAE*, 18(3):444, 1975). Thus, a reduction of damage from just this one area of the combine could substantially reduce the total amount of mechanical damage sustained by the corn in the combine. Some of this damage is inherent in the design of the threshing mechanism, and the rest results with incorrect adjustments of the combine as crop conditions change.

The second factor affecting combine harvester efficiency is the amount of losses incurred in the harvesting process. It has been estimated that 3% to 5% more corn could be harvested in the United States if losses could be eliminated (Johnson, W. H. and B. J. Lamp, *Corn Harvesting*, AVI Publishing Co., Inc., Westport, Conn., 1966). The loss levels occurring do not substantially reduce the total production costs incurred, so that net returns are severely affected by the higher loss levels. While it is impossible to eliminate all losses when mechanically harvesting biological products, a reduction would still significantly affect production profits and world food supplies.

Automatic control has been successfully used in many applications ranging from manufacturing to space flight. However, only in the last ten years has there been a significant effort to apply automatic control to agricultural and mobile equipment. The continuing trend of population shift from farms to urban areas requires an increase in the labor productivity of the average farm. The quality of product must remain high. Due to the increasing technological complexity of the equipment used, the operator is frequently unable to make machine adjustments adequately when undesirable or rapidly changing operating conditions exist.

Until recently, most automatic control applied to agricultural tractors has been used for the purpose of guidance. Proposals have been made to use mechanical feelers to detect the rows of plants (Richey, C. B., "Automatic Pilot for Farm Tractors," *Agricultural Engineering*, 1959). Other direct mechanical feedback systems used disk blades to detect the furrow (Geosource, Inc., product brochure, "Tractor Autoguide System,"

Modesto, Calif., 1978). Others used the deflection of a mechanical feeler by the standing grain to guide a swather (Parish, R. and C. Goering, "Simulation of an Automatic Steering System for a Hydrostatic Vehicle," ASAE Paper No. 69-641, St. Joseph, Mich., 1969). An electrohydraulic guidance system has been developed based also upon the principle of direct mechanical sensing of the standing crop (Klaas GMBH, 1979). This system utilizes electrohydraulic valves to control the rear steering cylinders. Recently, a system of buried cables emitting high frequency radio waves for control was proposed. Antennas mounted on the tractor detect the transmitted signals and steer the vehicle (Young, R. and R. Schafer, "Vehicular Guidance Simulator for Digital Automatic Control," ASAE Paper No. 77-1582, St. Joseph, Mich., 1977). Others have also used antennas to receive signals sent either from a buried cable, an operator riding on or walking nearby, or remote radio signals sent to control a hydraulically driven forage wagon (Puckett, H. G., E. Oliver Hyde, and H. Bealy, "Automatic Control of a Forage and Concentrate Distribution Vehicle," ASAE Paper No. 73-157, St. Joseph, Mich., 1973). One firm markets a guidance system based on triangulation of two radio transmitters (Ag-Nav, Inc., product brochure, Virginia, Ill., 1978). Microwaves have been proposed to detect heads of wheat in standing grain (Story, A., W. Johnson, and R. Stewart, "Remote Measurement of Concentration of Height of Head of Standing Grain with Microwave Energy," ASAE Paper No. 68-113, St. Joseph, Mich., 1969). This principle would also lend itself to guiding a machine. Recent work into automatic guidance has involved the use of infrared sensors attached to the header of a swather to detect the edge of the cut crop. This system was able to maintain an accuracy of 10 centimeters (3.9 in.) at speeds up to 12 km/hr (7.5 mph (Krause, A. E., "Swather Edge Guide Steering Control System", A.S.Ag.E.75-1029, 1976). Other methods of controlling farm vehicles consisted of indirect guidance in the form of slaving one vehicle to another.

The main thrust into automatic control of tillage operations has concerned itself with depth control. If the land is tilled too deep, excessive power is consumed, and moisture is lost. Tilling the soil too shallow reduces weed control and soil aeration. Planter depth control is also very important since planting too deep may result in poor stands due to the inability of the plant to emerge. Seeds planted too shallow may not receive sufficient moisture to germinate. Several systems for automatic depth control have been investigated, including one that used the deflection of a cylindrical spring to sense the variance of depth (Zoerb, G. and G. Paulsen, "Developments in Automatic Controls for Agricultural Equipment," paper presented at the Annual Meeting of the North Central Region of the ASAE, 1977).

An area of major interest in automating the combine has been header height control. The ability to control the length of stubble height accurately has been actively pursued in the past ten years. One investigator measured the center and mass moment of inertia of gravity of the combine and header to facilitate the modeling of a control system based upon a mechanical feeder and hydraulic valve (Rehkugler, G., "Dynamic Analysis of Automatic Control of Combine Header Height," ASAE Paper No. 68-623, St. Joseph, Mich., 1968). He found the linkage geometres and valve coefficients were important in determining responses (Pask, G., J. Wilson, and G. Zoerb, "Automatic Header-Height Control System for Windrowers," ASAE Paper No. 73-155, St. Joseph, Mich., 1973). Others have also used a mechanical sensor, but changed to an electrohydraulic valve to change the height of the sickle on a windrower. Still other investigators worked on developing header height control for the flexible floating cutterbar on a pull-type combine in soybeans (Voss, D. and T. Powell, "Automatic Header Height Control for Pull-Type Combine Harvesters," ASAE Paper No. 77-1548, St. Joseph, Mich., 1977). They were able to limit stubble height to less than 60 cm (2.36 inches) at 3 km/hr (1.86 mph). This was comparable to the accuracy achievable on current self-propelled machines. Other researchers also worked on developing an automatic height control system on a mechanical okra harvester (Richardson, M. and J. Craig, "Automatic Controller Simulation for Mechanical Okra Harvesting," ASAE Paper No. 75-1564, St. Joseph, Mich., 1975). As in most previous work, they found that simple on-off control was sufficient for the purpose.

Automatic control was used to maintain a self-leveling combine on hilly ground, which improved the threshing and separating efficiencies.

Other work on automatically controlling the combine has involved attempting to control the feed rate of the machine. Researchers determined that feed rate is the single most important non-design factor affecting grain losses (Friesen, O. H., G. C. Zoerb, and F. W. Bigsby, "Controlling Feedrates Automatically," *Agricultural Engineer*, 47(8):434, 1966). They stated that grain losses increase exponentially with feed rate increases and often exceed 20% before a limiting feed rate is reached. Their system consisted of a spring-loaded idler placed on the tight side of a chain used to drive the cylinder. The tension in the drive chain would then be directly proportional to cylinder torque. The system was connected through a spring-damper system to the handle of a four-way spool valve which metered flow to a hydraulic cylinder which could vary ground speed. They stated that on the basis of grain loss-feed rate tests, the automatically controlled combine lost less grain.

A grain loss monitor was developed to detect the amount of walker losses (Reed, W. B., "A Review of Monitoring Devices for Combines", Ames, Ia., 1969). The developers of this system also attempted to vary the ground speed based on this signal. A disadvantage they encountered was the significant time lag associated with this system. In the Netherlands, another group attempted to use the torque in the header auger as a signal indicating feed rates (Huisman, W., J. van Loo, and J. J. Heinjing, "Automatic Feed Rate Control of a Combine Harvester in Wheat," Departmental Report, Department of Agricultural Engineering, Agricultural University Wageningen, The Netherlands, 1977). Yet another researcher has obtained improved combine performance by controlling the forward speed and the cylinder speed as a function of feed rate (Eimer, M., "Function und Arbeitsqualitat der Drehzahlgeregelten Dreschtrommel," *Grundl. der Landtechnik*, 24(6):158, 1973). Feed rate has been measured by the deflection of the feeder chain in a rice harvester. Cylinder torque was also measured by the use of strain gauges (Kawamura, N. and K. Namikawa, "Automatic Feed Rate Control of Hydrostatic Driven Combine of the Head Feeding Type," *Research Report of Agricultural Machinery*, Number 4 and 5, Laboratory of Agricultural Machinery, Kyoto University, 1973). Work has been done on controlling the speed of the cylinder (Brizgis, L. J., "Automatic Cylinder Speed Control for Combines," unpublished M.S. Thesis, Univ. of Illinois at Urbana-Champaign, 1978). In that work, a continuous moisture transducer was used to sense changes in moisture content in soybeans. The output of this sensor was used to vary the control of an electric motor which changed the speed of a V-belt sheave drive and therefore the cylinder peripheral speed.

Automatic control requires accurate and timely inputs of information concerning the system to be controlled. For the combine, some of these inputs have been identified and sensors built to indicate machine and crop properties. Adequate methods of sensing crop properties have only recently become available. The moisture content of the crop being harvested seems to influence the damage and losses occurring in the threshing region. An accurate determination of crop moisture content that would be applicable to mobile equipment would permit this parameter to be used to change cylinder and other machine settings depending upon crop moisture content. Several different types of moisture detectors have been investigated. Most methods of determining moisture content rely upon the so-called dielectric properties of biological materials. Some show a relationship between moisture content and dielectric constant (real permittivity) of biological materials (Nelson, S., "Electrical Properties of Agricultural Products—A Critical Review," *Transactions of the ASAE*, 16(2):384, 1973). Brizgis, supra, investigated a transducer used to continuously measure the moisture content in soybeans. One researcher has prepared a higtory of the development of devices capable of indicating grain loss levels on combines (Reed, W., "A Review of Monitoring Devices for Combines," paper prepared for the First International Grain and Forage Harvesting Conference, Ames, Iowa, 1977). He states that the first such instrument was patented in the German Democratic Republic in 1965 and, unlike later sensors, could not differentiate between grain and chaff. Since then, others have further developed a loss monitor to the point of manufacture and sale. The basis of operation of conventional loss monitors consists of unseparated grain striking an acoustic sounding board. The frequency and amplitude of the vibrations are filtered to remove the extraneous noise induced by the machine and signals produced by non-grain material hitting the sensor. From this an electrical signal proportional to the acoustic signal is produced. The rate of loss indicated by a monitor is usually adjusted for ground speed or mass feed rate. Other methods of determining losses have been investigated. One attempted to use microwave measurements to determine grain loss levels (Jervis, B. W., G. S. Hobson, and F. A. Benson, "Some Microwave Measurements Upon Grain and Straw," Transactions of the ASAE, St. Joseph, Mich., 17(6):1139, 1974). This method was not very successful.

Recently the use of hydraulics on mobile equipment has increased rapidly. The versatility of hydraulics has been combined with electronics to produce a hybrid system that enhances the advantages of both. The current thrust of electrohydraulic applications on mobile agricultural equipment has concerned itself with two areas: hitch control and the control of hydrostatic transmissions.

Interest in this area has recently developed in both Japan and West Germany. Robert Bosch Gmbh is marketing an electrohydraulic three-point hitch system for agricultural tractors that allows electronic operator control. Advantages listed include high control effectiveness, the possibility of adding additional optimization circuits, as well as ease of operation. They claim a freedom in the physical arrangement of the system that allows the possibility of decentralized design of the tractor linkage. Others have attempted to control slip-draft in an agricultural tractor by use of an electrohydraulic servovalve. (Sakai, N. and K. Maehara, "Slip-Draft Control of Farm Tractor Use by Means of Electrohydraulic Automatic Control," *Bulletin of the Faculty of Agriculture*, Mie University, No. 50, 1975).

Much emphasis has recently been given to controllng the hydrostatic transmission of mobile equipment (Scott, G., "Hydraulic Controls for Hydrostatic Transmissions," Paper 4.3 from the Advanced Proceedings of the Hydrostatic Transmissions Seminar, MSOE, 1979). Several applications involve the use of electrohydraulic elements (Gupta, R., "Electrohydraulic Controls Applied to Hydrostatic Transmissions," Paper 4.2 presented at the Hydrostatic Transmission Seminar at the MSOE, 1979). The possibility of using electronic sensors to control the hydrostatic transmission which reduces power consumption has been suggested.

Others have used electrohydraulics to switch a papaya harvester automatically from 2- to 4-wheel drive (Meyers, A. and B. Gillespie, "Electrohydraulic Device for Shifting from 4-to-2 Wheel Steering," Transactions of the ASAE, 20(2):258, 1977). Automatic speed control of the driven front wheels of a John Deere grader also involved the combination of electronic sensors, electrohydraulic controllers, and hydraulic actuators (Henn, J., "Auxiliary Drive Improves Grader Efficiency," SAE Paper No. 79 0533, SAE, Warrendale, Pa., 1979).

The use of fiber optics mated to hydraulics to insure electrical isolation and freedom from electromagnetic interference has been investigated. (Dann, R., "Mating Fiber Optics and Hydraulics," *Machine Design*, Nov. 10, 1977, p. 133). This may have application in sensitive electrohydraulic systems on mobile equipment. The recent development of digital electrohydraulic valves may spur the development of this type of hydraulic control (El-Ibiary, Y.M., J. N. Wilson, and P. N. Nikiforuk, "Design and Performance of a Microprocessor-Based Digital Flow Control Valve," Proceedings of the 35th National Conference on Fluid Power, Chicago, Ill., 1979).

Recent technological advances in microprocessor design have far outstripped their applications on mobile equipment. The automotive industry has given a great deal of impetus to the use of on-board computers to optimize their products's performance, especially with regard to stricter environmental regulations for cars. This, combined with increasing energy costs, results in great potential for the use of on-board computers. Chrysler Corporation has published some results on applying a microprocessor to control spark advance. Conventional approaches to ignition timing using mechanical spark advance based on engine speed and manifold vacuum were not acceptable. Complex algorithms, fast response to changing conditions, and additional engine parameters added to the ignition timing equation precluded the use of a mechanical distributor, but was a natural application for a microprocessor. New sensors that measure engine parameters were not available and had to be developed (Lappington, J. and L. A. Caron, "Chrysler Microprocessor Spark Advance Control," SAE Paper No. 780117, SAE, Warrendale, Pa., 1978).

Two European companies, Citroen and Bosch ("Integrated Ignition System Has No Distributor," *Automotive Engineering*, January, 1979), have developed electronic ignition systems which utilize a microprocessor as the controller. Other on-board computer applications involve control systems to replace the engine camshaft, and control systems for carburetion (Chenea, P. F., "Systems Engineering Applied to Engine Control," *Automotive Engineering*, 86(10):88–91, 1978). In Canada, researchers have developed a microcomputer-based hydraulic cylinder controller (McKechnie, R. E. and G. W. Vickers, "Microprocessor Controls Cylinder Sequence," *Hydraulics and Pneumatics*, May, 1979). An 8-bit microprocessor controls the spool position of electrohydraulic valves whose output flow controls the direction of the cylinder rams. The major advantage of using this computer-controlled hydraulic system is the ease with which the controlling software and thus the sequence of the cylinders could be changed. The authors also address the relative cost of using microprocessor control, and point out the large saving associated with the designer developing the software, rather than purchasing it off the shelf.

The invention may best be understood by referring to the following description and accompanying drawings which illustrate the invention. In the drawings.

Figure 1:
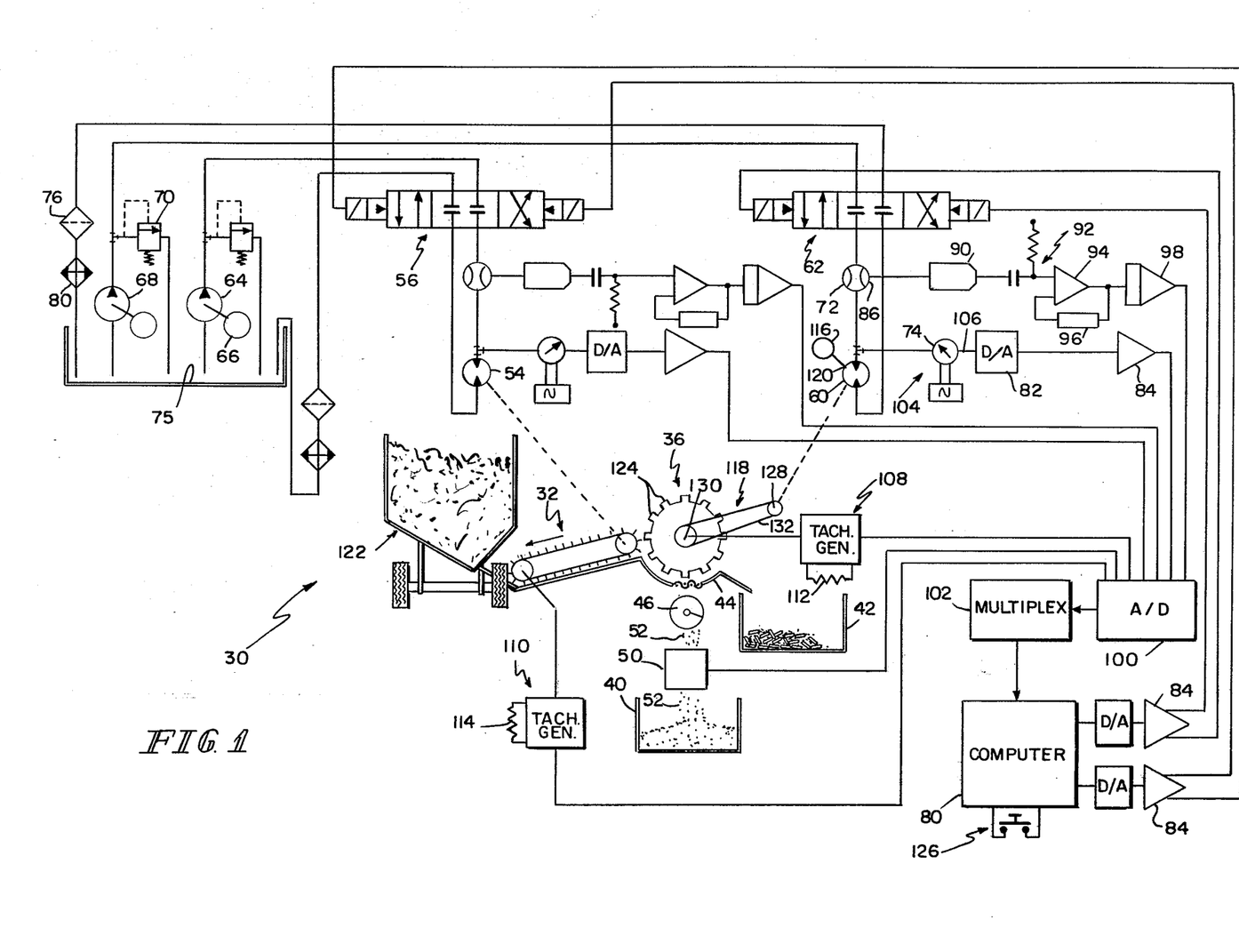
FIG. 1 is a partly block and partly schematic diagram of a system constructed according to the invention.

FIG. 1 illustrates the threshing apparatus 30. The apparatus 30 consisted of the feeder conveyor 32 from a 4.5 meter (15 foot) grain platform header from a New Idea UNI-SYSTEM 710 combine, fitted to a 56 cm (22 inch) diameter conventional rasp-bar cylinder 36, also from a New Idea 710 combine. The cylinder 36 was 90 cm (35 inches) in width. The underslung slat-type feeder 32 was used to convey material into position for the cylinder threshing operation.

For purposes of analysis of cylinder 36 output, two boxes 40, 42 were constructed to collect the material separated through the concave area 44 and the material normally delivered to the combine's straw walkers (not shown). A 10 cm (4 inch) diameter auger 46 was mounted under the concaves. A continuous moisture transducer 50 was mounted in the auger to permit measurement of the stream of threshed grain 52 falling through the concave 44.

The feeder 32 was driven by a MAD 08 Ross Gear Torqmotor 54. The flow to this motor was controlled by a SLI Industries Century series electrohydraulic proportional flow control valve 56. The cylinder 36 was driven from a MAB 16 Ross Gear Torqmotor 60, with speed and direction controlled by a Moog Series 62 electrohydraulic servoflow control valve 62.

Figure 2:
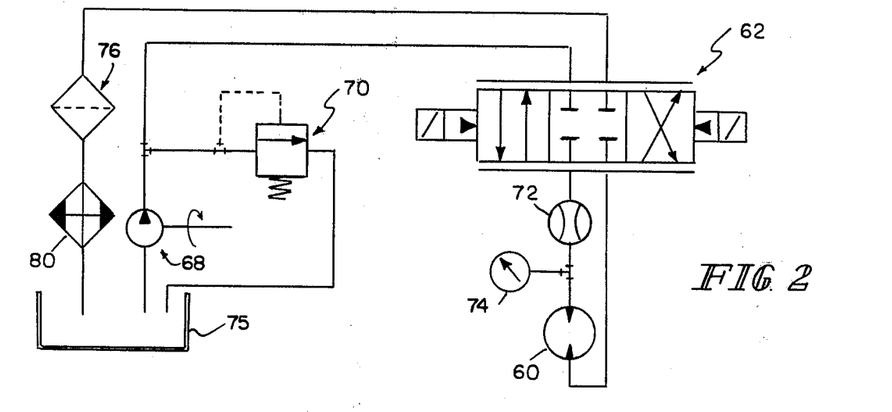
FIG. 2 is a partly block and partly schematic hydraulic circuit diagram of a hydraulic system constructed according to the invention.

The hydraulic power for the cylinder 36 was provided by a Ford model 4000 or 8000 tractor. The oil for the feeder motor 54 was provided by a model P3 Borg-Warner gear pump 64, driven by a 9 horsepower electric motor 66. A hydraulic circuit diagram is shown in FIG. 2.

As is indicated, the pump 68 for the cylinder 36 motor 60 was protected by an adjustable relief valve 70. The flow was passed directly to the electrohydraulic proportional directional control valve 62. The flow and pressure were sensed before the motor 60 by a flow meter 72 and a pressure sensor 74. The return flow to the oil reservoir 75 passed through a 10 micron filter 76, and an oil cooler 80.

Figure 3:
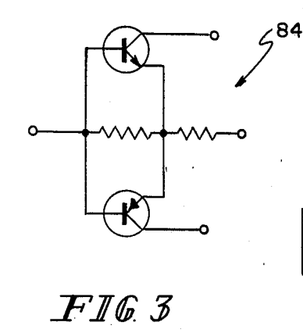
FIG. 3 is a schematic diagram of an amplifier used in connection with the present invention.

During runs, automatic data acquisition and real time control facilities on a Digital Equipment Company PDP-11/70 computer 80 were used. A digital-to-analog converter (D/A) produced voltages proportional to digital data values. These voltages were fed into a linear amplifier (FIG. 3) to obtain sufficient current to drive the solenoids controlling spool positioning in the valves 56, 62.

Figure 4:
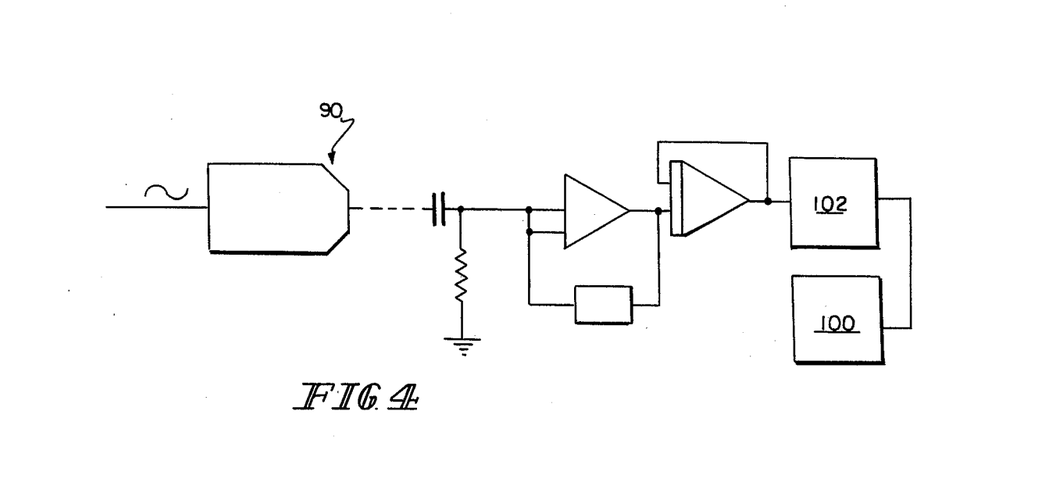
FIG. 4 is a partly block and partly schematic diagram of a frequency-to-voltage converter used in connection with the present invention.

Flow sensor 72 was a Flo-tech model FSM 1000T vane-type transducer. A magnetic pickup 86 on sensor 72 generated a frequency proportional to the flow, with a listed accuracy of 2% of the full scale output of 3.2 liters per second (50 gallon per minute). This signal was fed through a frequency-to-analog voltage conversion circuit 90 (FIG. 4). The frequency signal at the output terminal of circuit 90 consisted on pulses and was fed through an RC differentiator 92, a comparator 94, and a feedback limiter 96. The result was to produce at the output terminal of comparator 94 a square wave of a definite area for each pulse. An integrator 98 sums the areas and produces a voltage proportional to the number of pulses, with a full scale accuracy of 0.05%. This voltage, now proportional to the flow, was converted to a digital signal in a 12-bit analog-to-digital converter (A/D) 100, which had an accuracy of 15 millivolts. A 16-channel multiplexer interface 102 for the A/D allowed a rate of approximately 200 conversions per second.

Pressure measurements were obtained by the use of a strain gauge type pressure sensor 74. Sensor 74 was a model A-10 manufactured by Sensotec and had a rating from 1 to 138 bar (0 to 2000 psi), with a listed accuracy of 1.0% of full scale output. The excitation voltage of 10 volts was obtained from a BLH oscilligraph recorder 104. The output signal at 106 of the strain gauge 74 was coupled to a Dana instrumentation amplifier 84 and thence to the multiplexed A/D 100.

Servo-tek Model ST-7336B-1 DC tachometer generators 108, 110, respectively, were mounted on the cylinder 36 and feeder 32 shafts to indicate their speeds. The rotating shafts generated voltages which were measured across 50 ohm resistors 112, 114, respectively, and were also coupled into the A/D 100. The manufacturer of these transducers listed an accuracy of 0.1% (full scale output).

Moisture Transducer 50 was a MCS, Inc system 4743 moisture transducer and readout. This type of sensor has been used in soybeans (Brizgis, supra). A physical description of the transducer and calibration curves can be found in Brizgis. The principle of operation of this transducer is based on the dielectric constants of materials (Nelson, supra). The dielectric constants of biological materials are severely affected by the presence of water. Thus, a small amount of water present in grain can be detected by the induced change in dielectric constant.

An additional tachometer 116 was mounted on motor 60 to permit measurement of the slip of the belt drive system 118 for motor 60. Tachometer 116 consisted of a magnetic pickup 120 installed on the end plate of hydraulic motor 60. The tachometer 116 output was an AC signal, which was also converted by the frequency-to-voltage conversion circuit of FIG. 4 including multiplexer 102.

THE DATA COLLECTION PROCEDURE

Ear corn from the Purdue University Agronomy Farm was gathered. The ear corn was picked so that it would be in a comparable condition to that provided by the snapping rolls of a combine corn header. The varietal type was Beck's 65X, a medium season hybrid. The ear corn was stored in a side-drop gravity flow wagon 122 (FIG. 1). The moisture content varied from 33%, wet basis, during the first test runs, to an equilibrium moisture content of 11%, w.b., on the final runs. The 11% moisture content resulted from inside storage of the corn.

During each timed test run, a stream of ear corn was delivered to the throat of the feeder 32 housing by regulating a gate on the wagon (see FIG. 1). Care was taken to insure uniform feeding of the material into the feeder 32.

Figure 5:
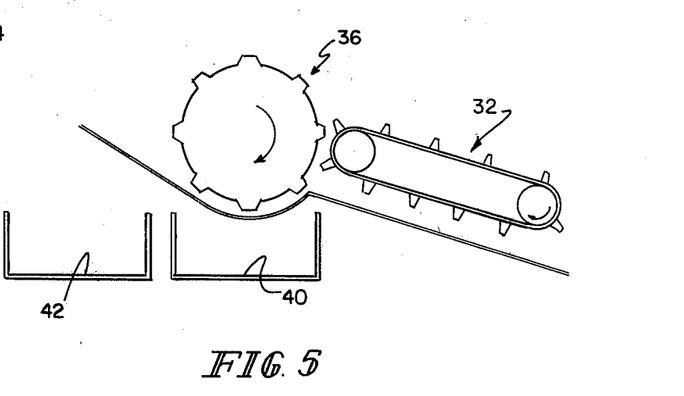
FIG. 5 is a highly diagrammatic sectional side elevational view of a system constructed to test the present invention.

Turning now to FIG. 5, the corn to be threshed entered the feeder 32 and was conveyed into position for the cylinder 36. The rasp bars 124 on the cylinder 36 threshed the corn from the cob. The threshed kernels then fell through the concave grate 44 into box 40. The unthreshed or unseparated corn and material other than grain (MOG) were transported by the action of the rotating cylinder 36 to the rear and were ejected into box 42. The material in the boxes was weighed and the elapsed time recorded to provide a measure of the average mass feed rate.

The computer 80 was responsible for starting up the cylinder 36 and the feeder 32 to a predetermined set of conditions before the flow of corn was initiated. A "ready" status was then indicated on a CRT located at the test site when the desired initial conditions were satisfied. The computer sensed the closing of a push-button switch 126, then enabling the operator to communicate with the processor without halting the automatic data acquisition and control functions. Switch 126 was used to initiate and control program execution.

The durations of the tests were from 50 to 120 seconds due to the limited volumes of the collection boxes 40, 42.

The collected data was immediately stored on hard disk. Later it was transferred to floppy diskette storage. Data analysis was facilitated by plotting control values and controlled parameters versus time.

Figure 6:
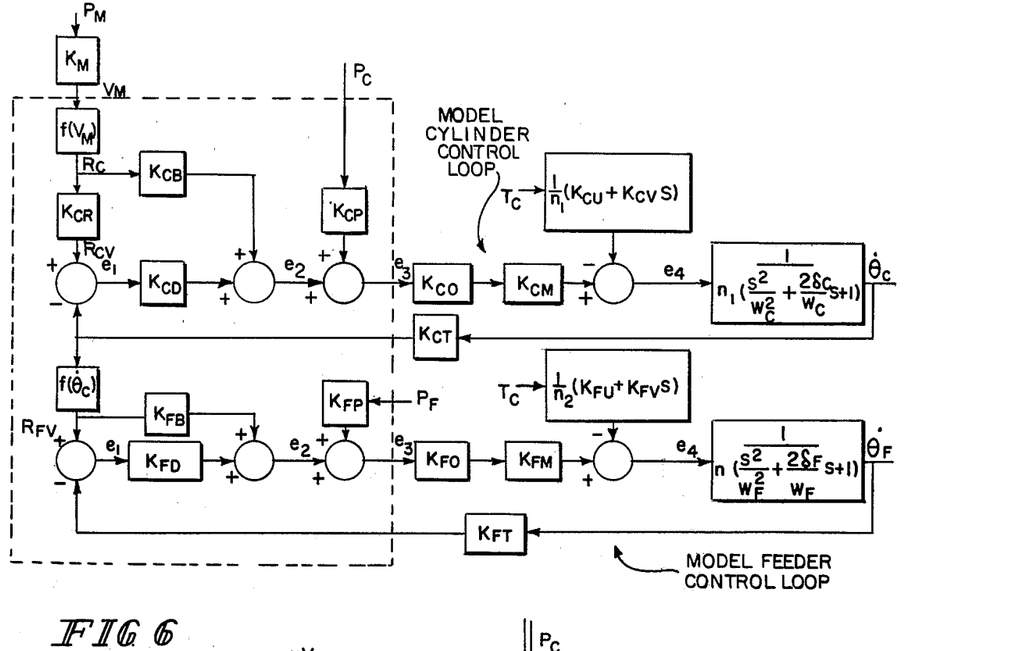
FIGS. 6 and 7 are block diagrams of a system constructed according to the present invention.

The peripheral speed of the cylinder 36 of a combine in corn is observed to vary frequently by 0.8 meters per second (150 feet per minute) and in some circumstances, such as in high yield or weedy areas of a field, by as much as 3 m/s (580 f/m). This set a goal for the performance of the cylinder 36 control system, such that speed fluctuations of 0.8 m/s (150 f/m) from the setpoint would be acceptable, and except under high material feed rates, variations greater than 1.5 m/s (400 f/m) for extended periods of time would be objectionable. The desired setpoint was changed depending upon crop conditions, primarily moisture content. The corn to be threshed varied from 33.5% w.b. to an equilibrium moisture content of 11.2% w.b. Thus, the early data reflected operation at an appropriately higher setpoint than the later runs. The setpoints used were obtained from a combination of recommendations of the manufacturer and from observation of the damage to the shelled corn, and the amount of unthreshed corn emerging from the rear of the cylinder 36. Certain assumptions were made about the physical system. A block diagram representation of the theoretical system used for modeling combine functions is shown in FIG. 6. The dashed portion (also shown separately in FIG. 7) illustrates the digital computer. The closed loop transfer function for either loop of FIG. 6 is given by:

$$\dot{\theta}(s) = \frac{K_Q K_M (K_B + K_R K_D) R_C + K_P K_Q K_M P_C - 1/n(K_U + K_{VS}) T_C}{n\left(\frac{s^2}{\omega^2} + \frac{2\delta}{\omega} s + 1\right) + K_D K_Q K_M K_T}$$

The initial input to the system $P_M$ was the moisture content of the corn passing through the grate of the concave 44. This parameter was measured by the use of the moisture transducer 50. Variable gain $K_M$ associated with the electronics of the transducer 50 provided a voltage proportional to the moisture content of the corn. The voltage output $V_M$ associated with moisture content was then used to calculate the desired setpoint $R_C$ of the cylinder speed.

Figure 8:
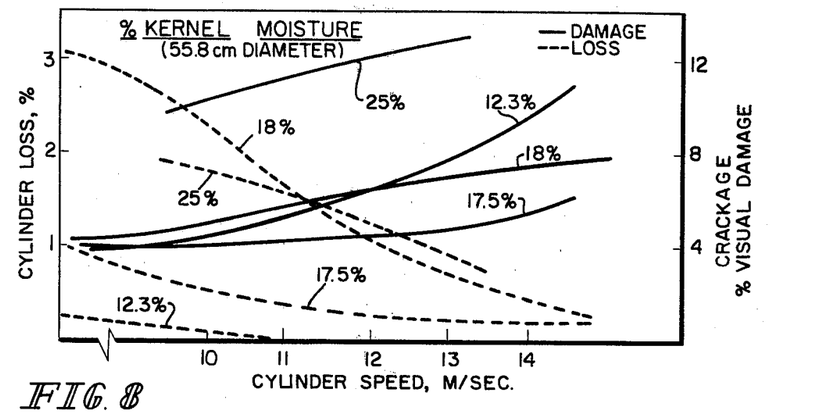
FIGS. 8 and 9 are graphs of threshing cylinder grain loss (%) on the left-hand ordinate and visually perceptible grain damage (%) on the right-hand ordinate, both plotted as functions of cylinder speed (m/sec) on the abcissa.
Figure 9:
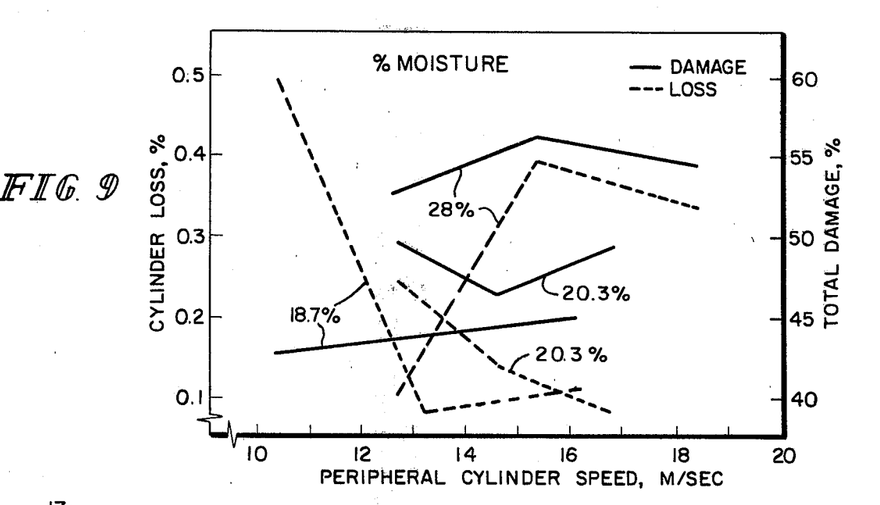

Experimental results have shown a relationship between peripheral speed of the cylinder 36 and loss and damage for various moisture contents (Morrison, C. S., "Attachments for Combining Corn", Agricultural Engineering, 1954,36:37, and Paulsen, M. and W. Nave, "Corn Damage from Conventional and Rotary Combines," ASAE Paper No. 78-1562, St. Joseph, Mich., 1978; see FIGS. 8 and 9). Damage increases with increasing cylinder 36 speed. The effect of moisture content is to shift the y-intercept and slope of the line of speed versus damage.

Cylinder 36 losses decrease as the speed of the cylinder 36 is increased. Again, the effect of moisture is to shift the loss curve and to change the slope. As the moisture content of the crop varies, the optimum machine setting varies as a function of the losses and damage incurred. The criterion used to determine the setpoint based upon the relationships indicated by these curves must also take into account the relative importance of losses and damage to the farmer. Dockage for excessive kernel damage is seldom levied because most corn is sold as U.S. No. 2 since little market currently exists for U.S. No. 1 corn. Therefore, field losses are more often the factor of the greatest economic importance in corn. In other crops such as soybeans, damage would be the parameter to minimize since this crop is more susceptible to damage.

The relationship relating the proper setpoint for the cylinder 36 speed controller should then reflect the effect of changing moisture content upon the cylinder 36 losses present. In general, decreasing moisture content requires decreasing the peripheral speed of the cylinder 36.

Since each run was of limited duration and since the corn was stored inside, and reached an equilibrium moisture content, the output from the moisture transducer 50 was compared to the moisture content indicated by a conventional Burroughs moisture meter. Because the threshed corn had a constant moisture content, the control system was modified for the experiments. This modification entailed establishing the reference for the cylinder 36 speed controller from an external determination of moisture content and observations of the threshed material, manufacturer's recommendations, and experimental results. An additional justification for this modification could be the real absence of quantitative data relating the moisture content to the best cylinder 36 speed, as well as not having a complete combine cleaning system available. Rewetting of the material was attempted. However, the amount of material needed for high mass-feed rates made this generally impractical. Thus, the majority of runs were made at one moisture content.

Figure 10:
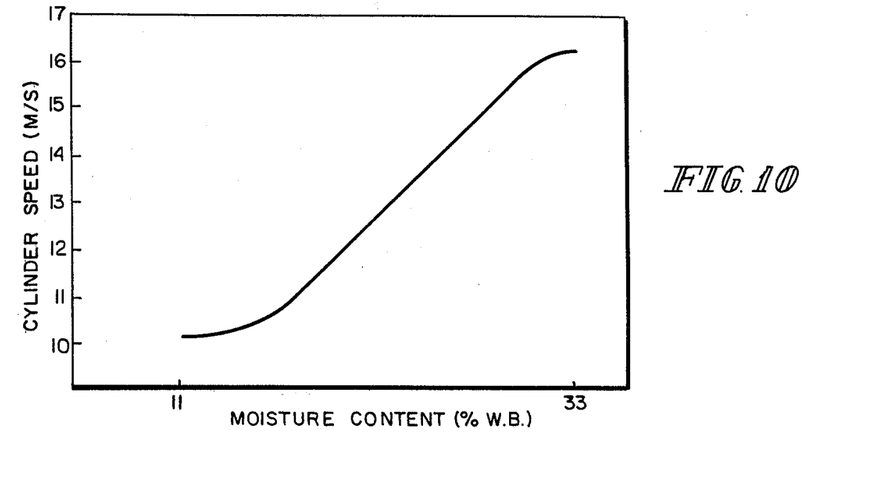
FIG. 10 is a graph of cylinder speed (m/sec) as a function of grain moisture content (%, wet basis)

The setpoint for the cylinder 36 speed $R_C$ in m/s was then established. This value varied from 16.3 m/s (3200 f/m) to 10.3 m/s (2000 f/m) (see FIG. 10).

The computer 80 compared the requested setpoint to the indicated speed from the tachometer 108. The output of the tachometer 108 was a voltage proportional to the speed of the cylinder 36 shaft, this voltage was then converted into a digital number by the A/D, which was then converted back into a speed by the use of a calibration constant.

Thus, the error between desired speed and actual speed was computed digitally. In terms of the block diagram and subsequent control analysis, the conversion into a digital signal presented a control analysis problem, thus an additional gain ($K_R$, volts per m/s) was introduced to convert the desired setpoint into an indicated voltage which was then compared to the voltage produced by tachometer 50. The resulting error ($e_1$, volts) was multiplied by a gain ($K_{CD}$) to establish the appropriate number to be loaded into the D/A. The cylinder 36 speed setpoint was also used to set a bias gain ($K_{CB}$, volt per meter per second) for the D/A.

During initial work on a control algorithm, it was discovered that an additional input of the pressure measured on the motor 60 driving the cylinder 36 would give an indication of the torque required to thresh the crop. As this torque increased, the flow through valve 62 decreased, and thus the speed of motor 60 decreased. An additional voltage proportional to the pressure ($P_C$, in millions of pascals—MPa) measured on the cylinder motor 60 was included to compensate for the flow lost due to an increase in the torque required. This value was then multiplied by a constant ($K_{CP}$, volt per MPa) to give an addition to the voltage produced by the computer 80. The algorithm used was completely digital, with the summation of the three digital numbers related to speed, bias, and pressure. This number was then loaded into D/A 82, which produced a proportional voltage.

Figure 11:
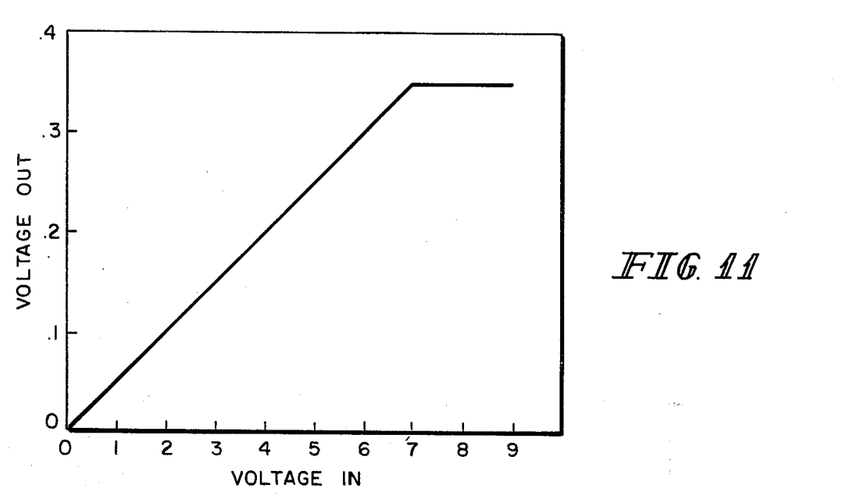
FIG. 11 is a graph of gain of an amplifier appearing in FIG. 6.

The next block includes the characteristics of the amplifier and valve 62 so that the gain ($K_{CQ}$) was in terms of liters per second per volt. This gain was actually a product of two other quantities, those being the amplification of the valve 62 input voltage to a current and the flow produced by the valve 62 for a given input current. The calibration curve for the amplifier 84 for a given input voltage is shown in FIG. 11.

The amplifier 84 has a very linear output with little hysteresis. The value of the valve 62 flow gain was supplied by the manufacturer. The volumetric displacement ($D_M$, liters per radian) of the motor 60 was also given by the manufacturer. The reciprocal of this multiplied by the flow produced by the valve 62 is then a velocity in terms of radians per second ($K_{CM}$). This assumed inconsequential leakage flows past the motor 60. The high efficiency Ross Gear motors 54, 60 used had listed volumetric efficiencies above 85% for the operating range used, so that this assumption would be valid.

A torque disturbance ($T_C$, Newton-meters) caused when corn entered the cylinder 36 was treated as yet another input to the control loop. This disturbance was reflected back to the hydraulic motor 60 by the ratio ($n_1$) of the sheaves 128, 130 used to achieve the appropriate range of speeds, the gain $K_{CV}$, (radians per Newton-meter), related to the flow-pressure coefficient of the valve 62 and the volumetric displacement of the motor 60, and a gain $K_{CU}$, (rad/N-m-sec), related to the contained volume of hydraulic oil, the bulk modulus of the oil, and the flow-pressure coefficient of the valve 62 (Merritt, H. E., *Hydraulic Control Systems*, J. Wiley & Sons, Inc., New York, N.Y., 1967). The differential operator s (sec$^{-1}$) was also included to provide mathematical equivalence.

The difference $e_4$, (radians per second) of the rotational speed produced by the motor 60 minus the effects of the torque was then adjusted for the effect of the belt drive 128, 130, 132 and the load and system characteristics. These characteristics are very important in terms of stability and speed of response of the system. The denominator of the system open loop gain is important in terms of stability of the system. It is given as:

$$\frac{s^2}{\omega^2} + \frac{2\delta}{\omega} s + 1$$

$$\omega c = \sqrt{\frac{4\beta_e D_M^2}{V_t J_t}} \quad \delta c = \frac{K_{CE}}{D_M} \sqrt{\frac{\beta_e J_t}{V_t}}$$

$\omega_C$ is the hydraulic undamped natural frequency (rad/sec), and $\delta_C$ is the large damping ratio (dimensionless), indicating a stable system. Contributing to the stability of the system were the large inertia associated with the threshing cylinder 36, and the short connecting lines between the electrohydraulic proportional directional control valve 62 and the motor 60.

Finally, the output of the system ($\theta$ (s), radians per second) was the actual speed of the cylinder 36. The tachometer generator 108 generated a voltage ($K_{CT}$, volt per radian per second) proportional to the speed, which voltage was then fed into the computer 108 through an A/D. This digital signal was then compared to the reference signal as well as providing the input to the feeder speed control loop.

The actual cylinder 36 speed was the basis for determining the setpoint for the feeder 32 speed. A function (f ($\theta$), radians per second per volt) represents the control algorithm relating the cylinder 36 speed to the setpoint for the feeder 32 speed. The block diagram for the feeder 32 drive circuit is similar to that of the cylinder 36 circuit.

Figure 7:
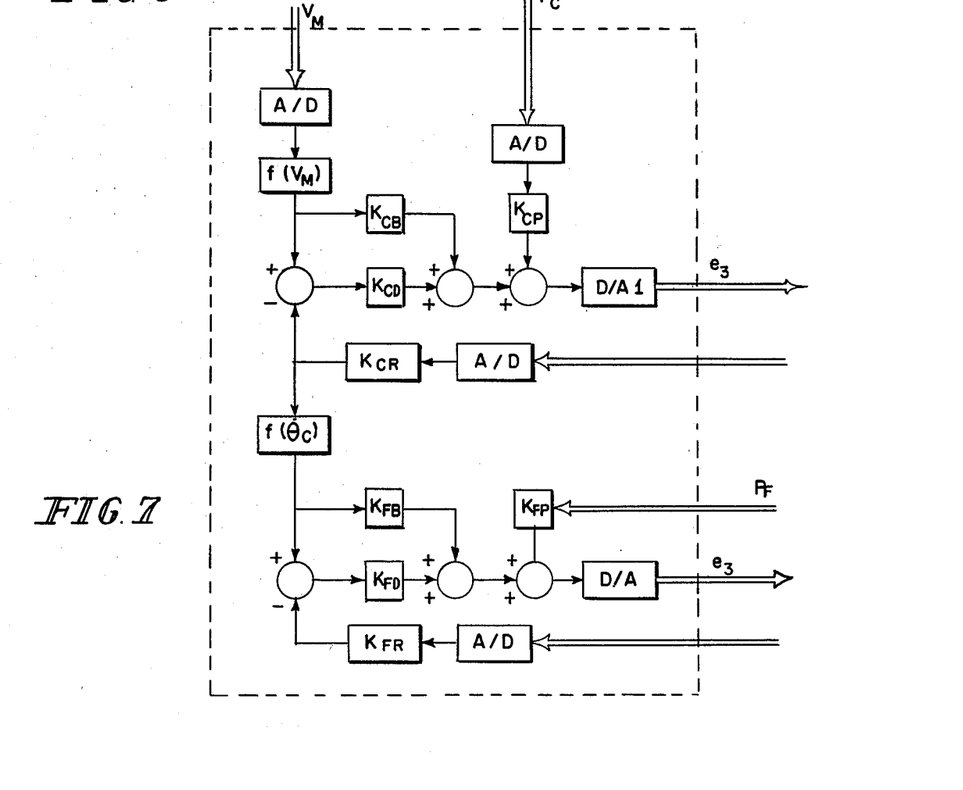

The complete system consisted of a combination of the apparatus (FIGS. 1 and 2) plus the controlling algorithm (FIGS. 6 and 7). At each stage of the development of the control algorithm, an attempt was made to insure that the simplest possible algorithm was used. This minimized problems associated with over-sophistication as well as decreasing the time needed for computation. As the analysis of results from test runs with a particular algorithm indicated needed changes, such changes were incorporated.

In the initial algorithm, the computer 108 compared the actual cylinder 36 speed and the setpoint to produce an error. The sign of this error was then used to vary, by a fixed amount, the number loaded into the D/A and thus the magnitude of voltage sent to the amplifier 84 and valve 62. The results of this algorithm indicated that it was not capable of meeting the performance criterion set for controlling the speed of the cylinder 36.

The initial control scheme was intended primarily to investigate the possibility of simple pulse control of the system. With further development or additional hardware, this type of digital control can be feasible.

The magnitude as well as the sign of the error was used in all subsequent tests. From analysis of the system it is known that the gain $K_D$ is important for system stability and response because this gain relates the amount of change of the controlling voltage due to the difference in the speeds desired and achieved.

When an optimization, consisting of adjusting the gain until the best possible response with maximum stability, would not consistently meet the performance index, the possibility of other factors influencing the system was considered. From an analysis of the data collected, it became clear that the pressure drop observed across the motor 60 affected the system due to the previously described decrease in flow from the valve 62. Therefore, an input based upon the pressure was included (FIGS. 6 and 7).

Figure 12:
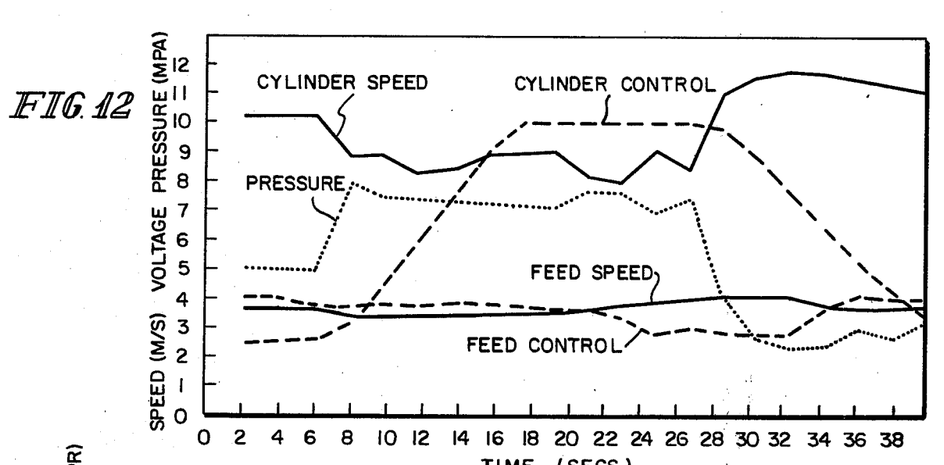
FIG. 12 is a graph of cylinder speed (m/sec), feed conveyor speed (m/sec), cylinder control signal (volts), feed conveyor control signal (volts), and pressure (Millions of Pascals—MPa), all as functions of time from the start of a run of grain on the system of FIGS. 6 and 7 without pressure compensation.

The inclusion of a pressure input ($P_C$) and its associated gain ($K_{CP}$) into the control algorithm, caused an overall increase in the ability of the system to meet the performance criterion. The effect upon system response and stability was studied. FIG. 12 shows the effect of no pressure-flow compensation. The initial rapid increase in pressure due to the corn entering the threshing region was not compensated for by an appropriate increase in the cylinder 36 control value (see time 6 seconds to 16 seconds). As a result, the cylinder 36 speed drops below the minimum speed for an extended period of time. The cylinder 36 control value continues to increase, but at too slow a rate. Increasing the control gain by itself only resulted in unstable behavior. Although the control value eventually reached the maximum value, increased control gain resulted in essentially an uncontrollable system, since no additional control action was possible. This occurred several times in the course of the research, and was due in part to increased feed rates requiring more horsepower than was available. The appropriate control responses should then have been to decrease the speed of the feeder 32 to such a point that the system was again controllable (FIG. 12 at 20 seconds). The response of the feeder 32 control was also too slow since it took almost 8 seconds after the maximum cylinder 36 value was reached for the feeder 32 speed to begin decreasing. The cylinder 36 eventually returned to the desired speed, but experienced some overshoot.

Figure 13:
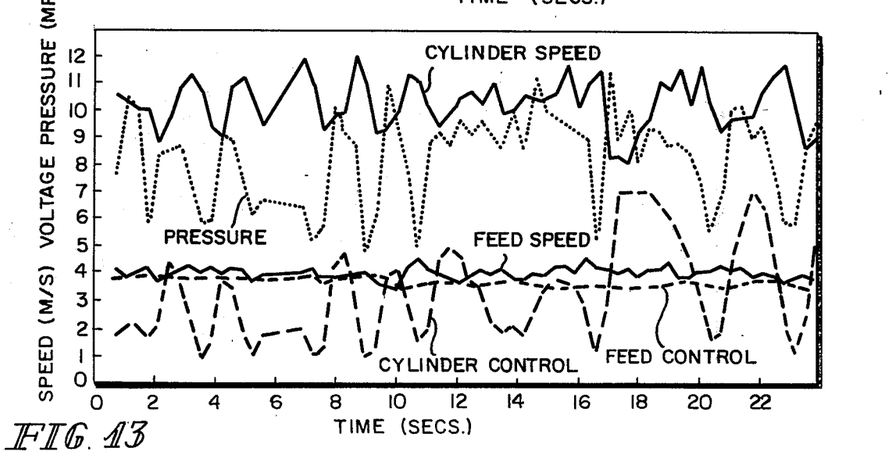
FIG. 13 is a graph of cylinder speed (m/sec), feed conveyor speed (m/sec), cylinder control signal (volts), feed conveyor control signal (volts), and pressure (MPa), all as functions of time from the start of a run of grain, on the system of FIGS. 6 and 7 with high pressure gain.

FIG. 13 shows the effect of too high a gain factor for $K_{CP}$, the pressure gain. The cylinder 36 speed tended to oscillate with the pressure. The occurrence of unstable or oscillatory behavior was also reduced upon operation at higher peripheral speed. This may have been due, in part, to the increase in momentum of the cylinder 36 mass. The inside storage of the corn used for the tests lowered the moisture content of the material so that the setpoint of the controller was lower than that normally seen under field conditions. However, since increasing momentum caused an improvement in the performance of the controller, the conditions encountered with unnaturally dry corn used in the experiments could be considered more severe than those which would ordinarily be encountered in the field.

The drop in speed of the cylinder 36 due to torque disturbances caused by a large amount of corn entering the cylinder 36 concave 44 region would also be less severe in the field due to the inertia of the internal combustion engine (on a self-propelled combine), and the separating elements of the machine which would tend to attenuate the torque effects. With a hydraulically driven cylinder 36 there is only the inertia of the cylinder 36, the hydraulic motor 60, the sheaves 128, 130, and the hydraulic oil between the valve 62 and the motor 60. Clearly, this value was much less than the value present on a machine used in the field, and compensation was provided. In addition, the effect of increasing the amount of the hydraulic oil would tend to decrease the stability of the system since the damping ratio $d_h$ is inversely proportional to the contained oil volume.

Figure 14:
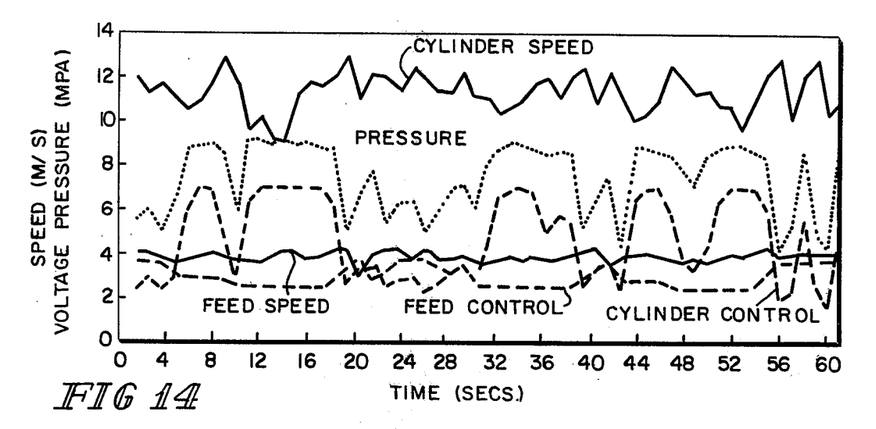
FIG. 14 is a graph of cylinder speed (m/sec), feed conveyor speed (m/sec), cylinder control signal (volts), feed conveyor control signal (volts) and pressure (MPa), all as functions of time from the start of a run of grain, on the system of FIGS. 6 and 7 with high biomass flow rate.

In FIG. 14, the system became uncontrollable for a period of 14 seconds, mainly due to an elevated mass flow rate. The dynamic interactions between the feeder 32 and cylinder 36 were not properly adjusted since the feeder 32 failed to slow the mass flow rate down to a level at which the cylinder 36 would be controllable. Despite this fact, the somewhat increased setpoint for the cylinder 36 resulted in greater momentum and the performance criterion was met.

Using the previously described method of collecting the material in boxes 40, 42, and weighing them, material feed rates were established. These varied from 0.88 to 3.65 kg/sec. Due to the low moisture content of the material, little threshing loss was measured during the period of time when the analysis was made. The amount of corn separated through the concave 44 and deposited in box 40 was a steady 57% of the input. Of the material collected back of the cylinder 36 in box 42, 53% was threshed corn.

Figure 15:
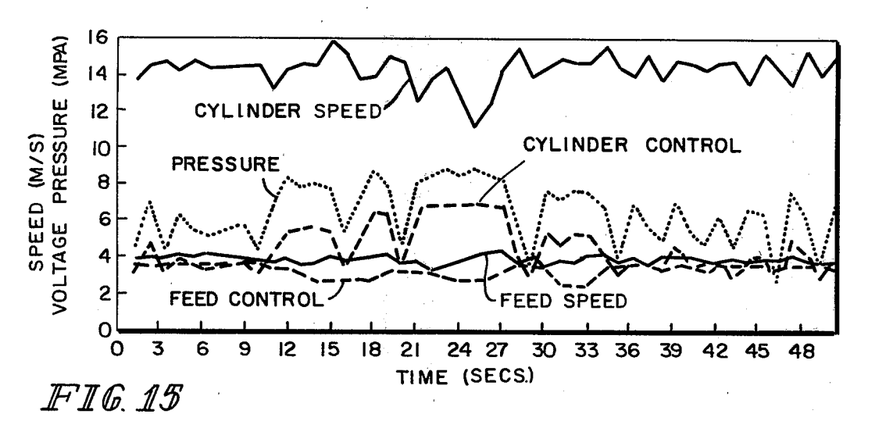
FIG. 15 is a graph of cylinder speed (m/sec), feed conveyor speed (m/sec), cylinder control signal (volts), feed conveyor control signal (volts) and pressure (MPa), all as functions of time from the start of a run of grain, on the system of FIGS. 6 and 7 with grain having a higher moisture content and a higher reference speed.

To investigate fully a wide range of conditions for the pressure compensated system, rewetting of the corn was necessary. Dry (11.0% w.b.) corn was placed into plastic bags and stored in a large cooler, which was maintained at 1.1° Centigrade. The corn was returned to a moisture content of 19.3% w.b. and threshed at higher speeds to study the effect of increasing the operating point. The threshing properties of this rewetted corn were not the same as corn of a comparable moisture content being harvested from the field. However, for these experiments, the difference was considered inconsequential. FIG. 15 shows operation at a higher moisture content and thus a higher reference speed. The control of the cylinder 36 speed met the performance criterion in that the speed was maintained except when the torque increased to a high value as indicated by the rapid and prolonged rise in pressure on the motor 60.

Figure 16:
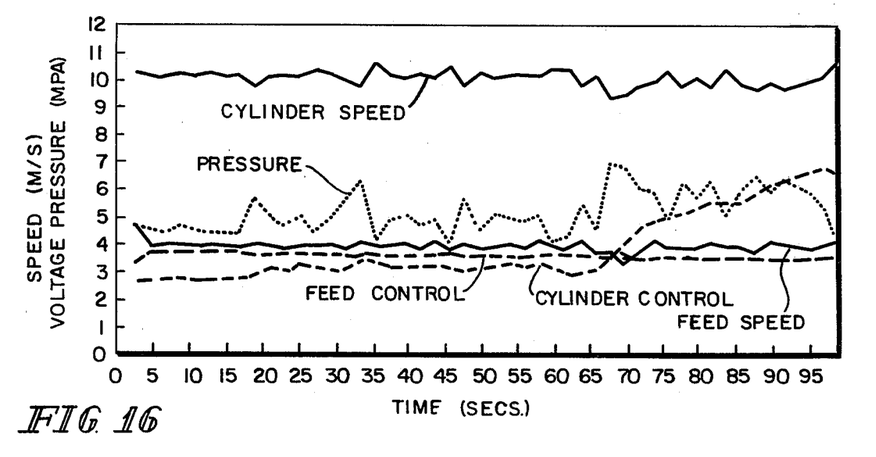
FIG. 16 is a graph of cylinder speed (m/sec), feed conveyor speed (m/sec), cylinder control signal (volts), feed conveyor control signal (volts) and pressure (MPa), all as functions of time from the start of a run of grain, on the system of FIGS. 6 and 7 with a step change in biomass input.

To investigate the response of the system to step changes in material feed rates, material was fed into the apparatus at two different rates. FIG. 16 shows the effect upon the system to a step input in mass-feed rate. The system was allowed to come to equilibrium for 15 seconds, at which time corn was allowed to enter the feeder 32. The immediate increase in motor 60 pressure can be seen. From 15 seconds to 65 seconds the mass-feed rate was continued at the relatively low level of 1.35 kg/sec. At 65 seconds, the box 40 catching the threshed corn was changed and a higher mass-feed rate of 2.73 kg/sec was established. The corresponding increase in pressure indicated this increased rate. The algorithm used at this time did not include the input of motor pressure. It can be seen that the system was almost out of the permissible range before the controller responded.

Figure 17:
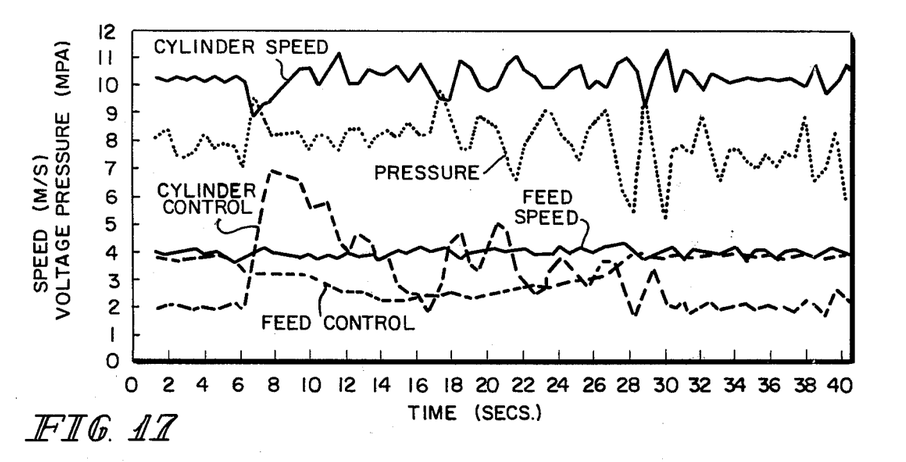
FIG. 17 is a graph of cylinder speed (m/sec), feed conveyor speed (m/sec), cylinder control signal (volts), feed conveyor control signal (volts) and pressure (MPa), all as functions of time from the start of a run of grain on the system of FIGS. 6 and 7 with final values selected for the control algorithm.
Figure 22:
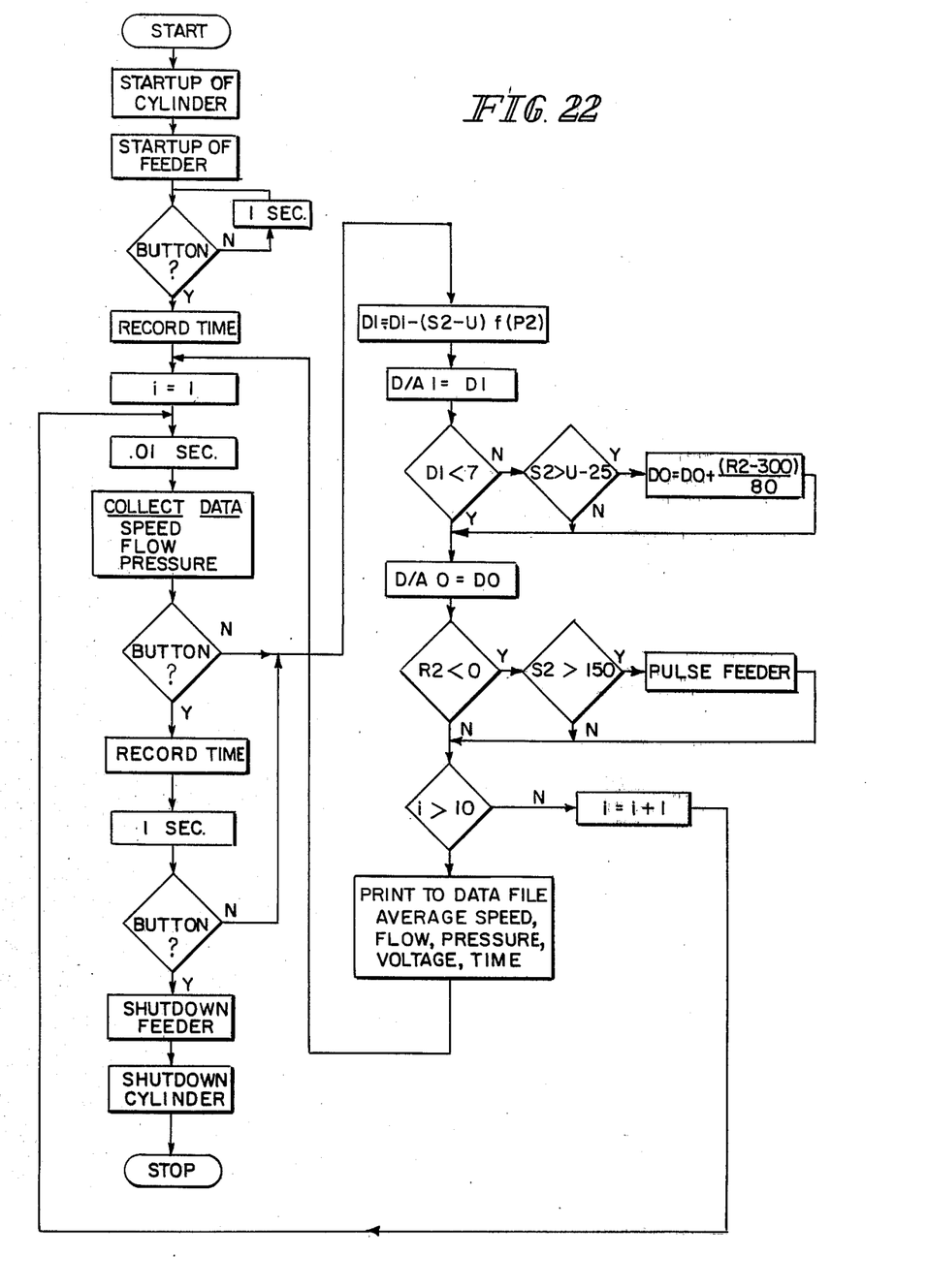
FIG. 22 is a flow diagram of the algorithm which controls the behavior of the system.

Finally, FIG. 17 shows the output of the final algorithm (FIGS. 6 and 7). The cylinder 36 speed exceeded the performance criterion by a small amount upon the initial torque increase due to the corn entering, but was thereafter within the speed constraints, even at an elevated mass flow rate. FIG. 22 illustrates the complete flow diagram of the final algorithm used.

If derivative control were used with this system's proportional control, the oscillations of cylinder 36 speed (FIG. 22) could be even further reduced.

The determination of valued for the gains of the block diagrams (FIGS. 6 and 7) required some approximating. The two parameters of significance in terms of response and stability of the system are the undamped natural frequency, $\omega$ and the damping ratio $\delta$. The natural frequency is a function of the hydraulic and mechanical characteristics of the system, one of which is the effective bulk modulus of the oil. Merritt, supra, suggests using a value of 100,000 psi, determining this value by experimental observation. Variations might be caused by changes in the amount of entrapped air in the oil. The volumetric displacements of the motors 54, 60 were supplied by the manufacturer. This and measurement of the volumes of the hydraulic lines permitted determination of the contained volume of oil $V_t$. Interaction between the spring-like effect of the entrapped oil and the mass of the mechanical parts establishes a resonance which limits the dynamic performance of the system. The inertia of the cylinder 36 was previously determined by the pendulum method and was found to be 11.4 N-m-sec$^2$ (Baker, Unpublished M.S. Thesis. Purdue University, 1976). Because of this large value, the inertias of the hydraulic motors 54, 60 were considered to be insignificant.

The damping ratio is also a function of the hydraulic and mechanical characteristics. The damping ratio is made up of two parts, one due to the load inertia, and another due to the viscous damping of the load (and motor). The load-damping coefficient contributes very little to the damping ratio and is not included. Thus, the damping ratio is made up of the flow-pressure coefficient of the valve 56, 62, the volumetric displacement of the motor 54, 60, the effective bulk modulus of the oil, the inertia of the load, and the contained fluid volume. Of these, only the flow-pressure coefficient of the valve 56, 62 is a derived quantity.

Figure 18:
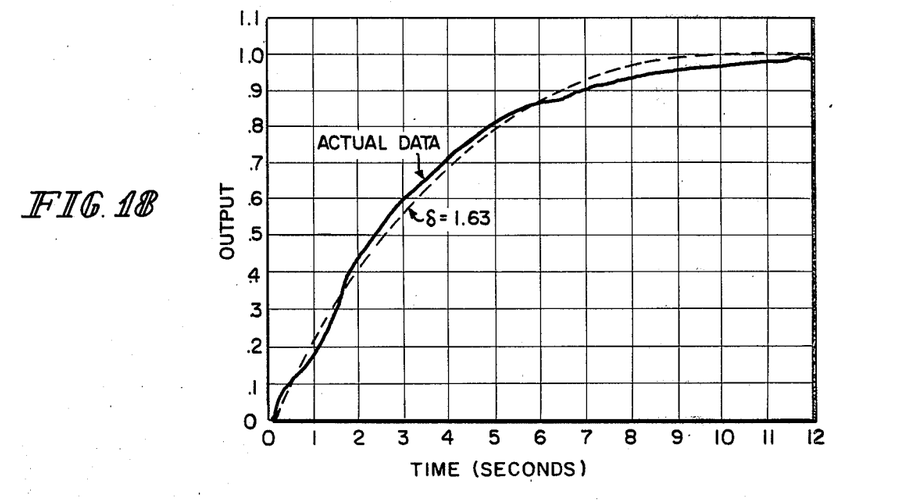
FIG. 18 is a graph of response of the threshing cylinder to a step input as a function of time, as well as a graph of theoretical response using the calculated damping ratio of the threshing cylinder system.
Figure 19:
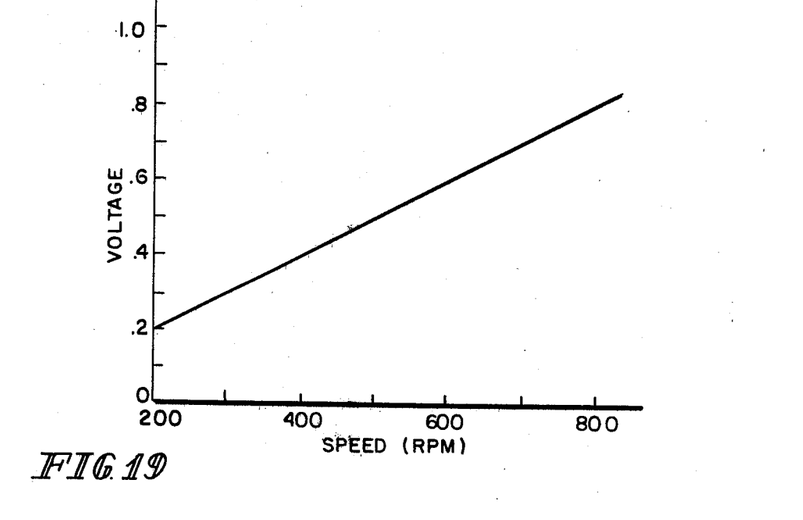
FIG. 19 is a tach-generator calibration curve (volts per rpm) for a tach-generator used in the system.
Figure 20:
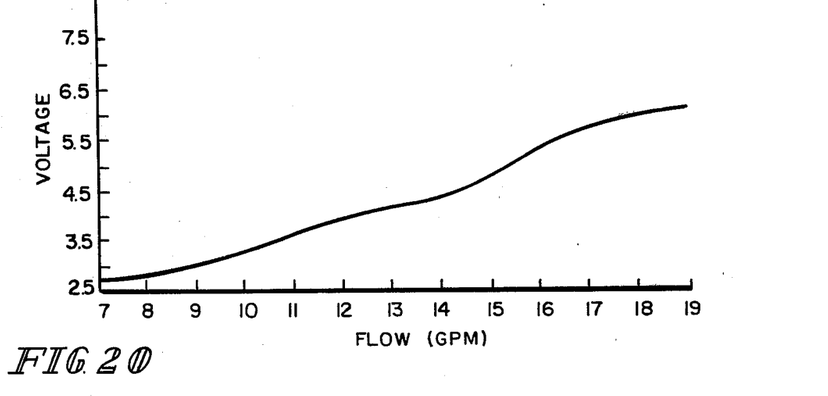
FIG. 20 is a flow transducer calibration curve (volts per GPM) for a flow transducer used in the system.
Figure 21:
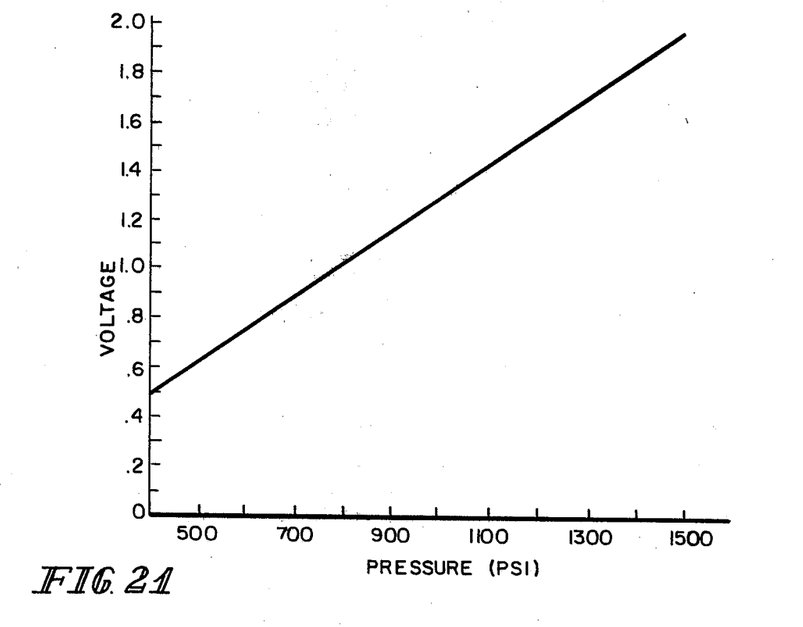
FIG. 21 is a pressure transducer calibration curve (volts per psi) for a pressure transducer used in the system.

The flow-pressure coefficient relates the change in flow from the valve 56, 62 for a given change in the pressure drop across the valve 56, 62. It is related to two other quantities, the pressure coefficient which relates the change in pressure for a given change in current to the valve 56, 62 solenoid, and the flow coefficient which relates the change in flow for a given change in current supplied to the solenoid. For the MOOG Series 62 valve 62 (used to control the cylinder 36), the flow coefficient was given as $1.9 \times 10^{-5}$ (base of natural logarithm to the negative fifth power) meters$^3$ per milliampere of current. The pressure coefficient was supplied by the manufacturer as 1.4 MPa per milliampere of current. Thus, the flow-pressure coefficient was the ratio of these two quantities and was determined to be $1.4 \times 10^{-11}$ meters$^3$ per second per pascal. The calculated camping ratio for the cylinder of 1.65 was verified by the actual system (see FIG. 18). The response of the output speed of the cylinder 36 due to a step increase in the commanded voltage closely follows the theoretical curve drawn for a damping ratio of 1.63 for a second order system, thus verifying the accuracy of the second order model.

All transducers used had somewhat linear responses with zero offsets. FIG. 22 illustrates a flow diagram of the computer algorithm used to control the apparatus. The control algorithms used were developed in the BASIC computer language, which affords the inclusion of user-defined functions.

In FIG. 22, U is the desired cylinder 36 speed (based upon the moisture content of the crop), and S2 is the actual speed indicated by the tachometer-generator 108 located on the threshing cylinder 36 shaft. R2 is the indicated speed of the feeder 32 shaft, while the desired feeder 32 speed is maintained at a normal operating speed of 300 rpm.

Occasionally, under high or irregular material feed rates, the crop would jam under the slats of the feeder 32 conveyor. To free the corn, the feeder 32 was momentarily pulsed to clear the jam by running feeder 32 in the direction opposite to its normal direction of motion for a short period of time. The push button 126 was connected to a logic sense line. Operating button 126 indicated a "yes" condition to the computer 80 and afforded program control without interrupting the data collection and control functions of the computer 80.

LIST OF SYMBOLS
(INDICATED VALUES ARE FOR THE CYLINDER 36 CIRCUIT)

A/D: Analog-to-digital converter
$\beta_e$: Bulk modulus of the oil ($6.89e^8$ pascal)
D/A: Digital-to-analog converter
$D_M$: Volumetric displacement of the motor ($3.08e^{-5}$ meters$^3$ per radian)
$\delta$: Damping ratio (1.65)
$e_1$: Difference between the setpoint and actual speed
$e_2$: Summation of the bias and multiplied error
$e_3$: Summation of "$e_2$" and multiplied pressure
$e_4$: Velocity of the motor shaft
$f(\dot{\theta})$: Functional relationship relating feeder setpoint speed and the actual speed of the cylinder
$f(V_M)$: Functional relationship between the setpoint for the cylinder speed and the moisture content of the corn
$J_t$: Inertia of load (11.4 N-m-sec$^2$)
$K_B$: Biasing gain (0.19 volt per radian per sec)
$K_{CE}$: Flow pressure coefficient of the valve ($1.43e^{-11}$ meter$^3$ per second per pascal)
$K_D$: Gain associated with the error in speed (0.25 volt per volt)
$K_M$: Reciprocal of volumetric displacement ($3.2e^4$ rad per meter$^2$)
$K_p$: Pressure compensation gain ($7.25e^{-9}$ volt per pascal) $K_Q$: Gain associated with the linear amplifier and electrohydraulic directional control valve (0.33 liter per sec per volt)
$K_R$: Gain relating to desired speed ($9.55e^{-2}$ volt per rad per sec)
$K_T$: Tachometer generator gain ($9.55e^{-2}$ volt per rad per sec)
$K_U$: Gain associated with hydraulic components
$K_V$: Gain associated with hydraulic and mechanical components
$n_1$: Ratio of the sheaves used (2.29)
$\dot{\theta}$: Output speed
$\omega$: Undamped natural frequency (3.06 hertz)
$P_C$: Measured pressure on the threshing cylinder drive motor
$R_C$: Reference or setpoint for the cylinder speed
$R_V$: voltage proportional to reference speed
s: Differential operator
T: Torque disturbance due to corn entering the system
$V_M$: Voltage proportional to the moisture content of the corn
$V_t$: Total contained volume of hydraulic oil ($6.18e^{-3}$ meter$^3$)

What is claimed is:

1. An automatic control for a combine which comprises a threshing cylinder and a feeder conveyor, the automatic control comprising means for driving the threshing cylinder, means for sensing the threshing cylinder drive speed, means including means adjacent the threshing cylinder for sensing the moisture content of the materials being threshed for establishing a desired threshing cylinder speed, means for comparing the threshing cylinder drive speed to the desired threshing cylinder speed and for producing a first output signal in response to such comparison, and means for coupling the first output signal to the means for driving the threshing cylinder to control it including controlling the speed of said cylinder by rapidly decreasing said speed as necessary to prevent excessive damage to the materials being threshed.

2. The automatic control of claim 1 and further comprising means for driving the feeder conveyor, means for sensing the feeder conveyor drive speed, means connected with said threshing cylinder drive speed sensing means for establishing a desired feeder conveyor speed, means for comparing the feeder conveyor drive speed to the desired feeder conveyor speed and for producing a second output signal in response to such comparison, and means for coupling the second output signal to the means for driving the feeder conveyor to control it.

3. The automatic control of claim 1 wherein the means for driving the threshing cylinder includes a hydraulic motor and the means for coupling the first output signal to the means for driving the threshing cylinder includes means for sensing the pressure drop across the hydraulic motor.

4. The automatic control of claim 2 wherein the means for establishing a desired feeder conveyor speed comprises means for providing a preselected function of the received threshing cylinder speed with said function being utilized for comparison with the feeder conveyor speed for generating a third output signal in response to such comparison.

5. The automatic control according to claim 1 including pressure change sensing means coupled to the feeder conveyor and adapted to control the feeder conveyor speed upon sensing potential feeder conveyor plugging conditions.

6. The automatic control according to claim 1 including pressure change sensing means coupled to the combine drive mechanism and adapted to at least partially regulate the ground speed of the combine.

7. The automatic control according to claim 1 including pressure change sensing means coupled to the threshing cylinder and adapted to at least partially regulate the rotational speed of the cylinder.

8. The automatic control according to claim 1 including torque sensing means coupled to the combine drive mechanism and adapted to at least partially regulate the ground speed of the combine.

9. The automatic control according to claim 1 including torque sensing means coupled to the feeder conveyor and adapted to at least partially regulate the rotational speed of the cylinder.

10. A method for controlling a combine threshing cylinder speed, comprising sensing the threshing cylinder speed, sensing the moisture content of the materials being threshed at a point adjacent the threshing cylinder, using said sensed moisture content in establishing a desired threshing cylinder speed, comparing the threshing cylinder speed to the desired threshing cylinder speed, generating a first output signal in response to such comparison, and controlling the threshing cylinder drive mechanism in response to the first output signal including decreasing the speed of the cylinder as needed to prevent excessive damage to the materials being threshed.

11. The method of claim 10 wherein the step of establishing a desired threshing cylinder speed comprises establishing a functional relationship between the moisture content and the desired threshing cylinder speed.

12. The method of claim 10 and further comprising sensing the combine feeder conveyor speed, establishing a desired feeder conveyor speed, comparing the desired feeder conveyor speed to the feeder conveyor speed, generating a second output signal in response to such comparison, and controlling the feeder conveyor drive mechanism in response to the second output signal.

13. The method of claim 12 wherein the step of establishing a desired feeder conveyor speed comprises the steps of sensing the threshing cylinder speed, comparing the threshing cylinder speed to the feeder conveyor speed, and generating a third output signal in response to such comparison.

* * * * *